United States Patent [19]

Kuo

[11] Patent Number: 5,562,346
[45] Date of Patent: Oct. 8, 1996

[54] LINEAR BALL GUIDE ASSEMBLY HAVING HIGH RADIAL LOAD CAPACITY

[75] Inventor: Chang-Hsin Kuo, Taichung, Taiwan

[73] Assignee: Hiwin Technologies Corp., Taichung, Taiwan

[21] Appl. No.: 585,224

[22] Filed: Jan. 11, 1996

[51] Int. Cl.⁶ .................................................. F16C 29/06
[52] U.S. Cl. ............................................................ 384/45
[58] Field of Search ................................... 384/45, 43, 44; 464/168

[56] References Cited

U.S. PATENT DOCUMENTS

| | | | |
|---|---|---|---|
| 4,304,443 | 12/1981 | Hoffmann | 384/45 |
| 4,363,526 | 12/1982 | Teramachi | 384/45 |
| 4,595,244 | 6/1986 | Teramachi | 384/45 |
| 4,692,038 | 9/1987 | Kasai | 384/45 |

*Primary Examiner*—Lenard A. Footland
*Attorney, Agent, or Firm*—Pro-Techtor International

[57] ABSTRACT

A linear ball guide assembly with four rows of steel balls having high radial load capacity includes two rows of steel balls on the top forming a 60 degrees' angle in the load directions. The load directions of one row of steel balls on the top and a lateral row of steel balls on the same side form an angle of 90 degrees. Because of the design mentioned above, this new type of guide assembly can increase both radial and lateral load capacity and rigidity for downward force. This present invention also includes protrusive flanges on the side plates and the guiding blocks. The protrusive flanges can perfectly match with the spot holes at both end of the ball grooves and circulating holes. Thus, the steel ball can move smoothly in the circulation system.

3 Claims, 16 Drawing Sheets

LINEAR BALL GUIDE ASSEMBLY HAVING HIGH RADIAL LOAD CAPACITY

BACKGROUND OF THE INVENTION

1. Field of the Invention

This invention relates to a linear ball guide assembly and more particularly relates to a linear ball guide assembly having four rows of steel balls and high radial load capacity.

2. Description of the Prior Art

Linear ball guide assembly has been widely used in precision machinery and instrument. Conventional linear ball guide assembly is usually classified by the row number of steel balls such as two-row, four-row or six-row. Four-row type is the most commonly used that can be further grouped into three different categories. Category one is shown in Figure I in which the load directions of the two neighboring rows of loaded balls (11), (12) are perpendicular to each other and intersect at point A within the rail (7). Category two is shown in FIG. 2 in which the load directions of the two neighboring rows of loaded balls (13), (14) are also perpendicular to each other but intersect at a point (point B) outside the rail (7). Category three is shown in FIG. 3 in which two rows of loaded balls (15) on the top have the same load directions and are perpendicular to the top surface of the rail (7). The other two rows of loaded balls (16) on lateral sides form 120 degrees apart with respect to that of upper loaded balls (15) as shown in FIG. 3.

Conventional linear ball guide assembly of category one and two cited above have equal load capacity in both horizontal and vertical directions. Guide assembly has strong rigidity when sliding body (1) is subject to upward pulling force. However, in practice the sliding body rarely subjects to a pure upward pulling force. The maximum value of upward pulling force is usually less than that of the downward force. The sliding body is usually subject to a combined force formed by downward radial and lateral directions. Unfortunately when radial force equals to lateral force, the load capacity of the guide assembly can only sustain 70% of that under lateral force for both category one and two types' guide assembly. Category three has better radial load capacity and can also bear some lateral force. However, category three has poor lateral rigidity and thus is not suitable for heavy duty machinery. Furthermore, the sliding body is difficult to be positioned precisely when grinding. To process the machining of the rail (7), the machine must have three spindles to form the ball grooves which are marked as "U" on the top side and "S" on both lateral sides (FIG. 4). This kind of machining process is very difficult due to positioning the relative position of "U" and "S" grooves. That is the reason why for this type the complex machining set up always induce the deviation of the balls' load directions from the original design.

SUMMARY OF THE INVENTION

It is an object of this invention to provide a linear ball guide assembly that has high radial load capacity. As shown in FIG. 5 for this present invention, the load directions of the two rows of balls on the top side form 60 degrees apart and intersect at a point located below the sliding body (point C). For the load directions of the two lateral rows of balls, each forms a about 30-degrees angle with the horizontal line and forms a about 90 degrees angle with the load directions of the top rows of the balls. Experimental results show that such a structure trader pure downward force can increase radial load capacity by 22% when compared with conventional category one or two guide assemblies, while rigidity can be increased by about 40%. When a combination of radial and lateral force is applied and the force direction is within the range of 0 to 80 degrees relative to the vertical line, the load capacity can be increased by 3.7% to 22%. But if upward pulling force is applied, it shows about the same load capacity as that in the category three guide assembly, i.e. its load capacity for upward pulling force is lower than that of category one or two guide assembly.

It is another object of the present invention to provide a linear ball guide assembly having smoother of steel ball circulation system. This steel ball circulation system contains side plates and guiding blocks both having C-shaped protrusive flanges, respectively in the sliding body, there are spot holes at each end of the ball grooves and also on ball circulation holes. Thereby, the protrusive flanges of the side plates and guiding blocks can match through these spot holes in the sliding body when the side plates and guiding blocks are fit into the sliding body. Due to the ball circulation holes and spot holes can be correctly manufactured, the side plates and guiding blocks can be positioned precisely and eventually improved the smoothness of the steel ball circulation. Furthermore, the invention designs a guiding lip on the side plate which can be inserted into the sliding body to help the steel ball move smoothly in the interval between the ball groove and connecting passage.

BRIEF DESCRIPTION OF THE DRAWINGS

The drawings disclose an illustrative embodiment of the present invention which serves to exemplify the various advantages and objects hereof, and are listed as follows.

DETAILED DESCRIPTION OF THE PREFERRED EMBODIMENT

Figure 1:
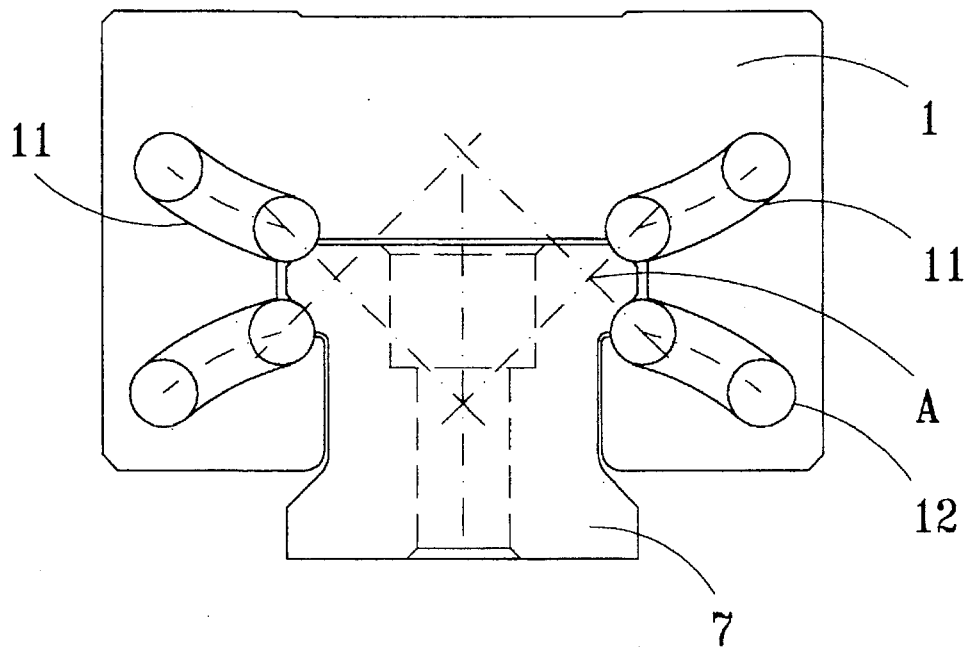
FIG. 1 illustrates the conventional category one linear ball guide assembly.
Figure 2:
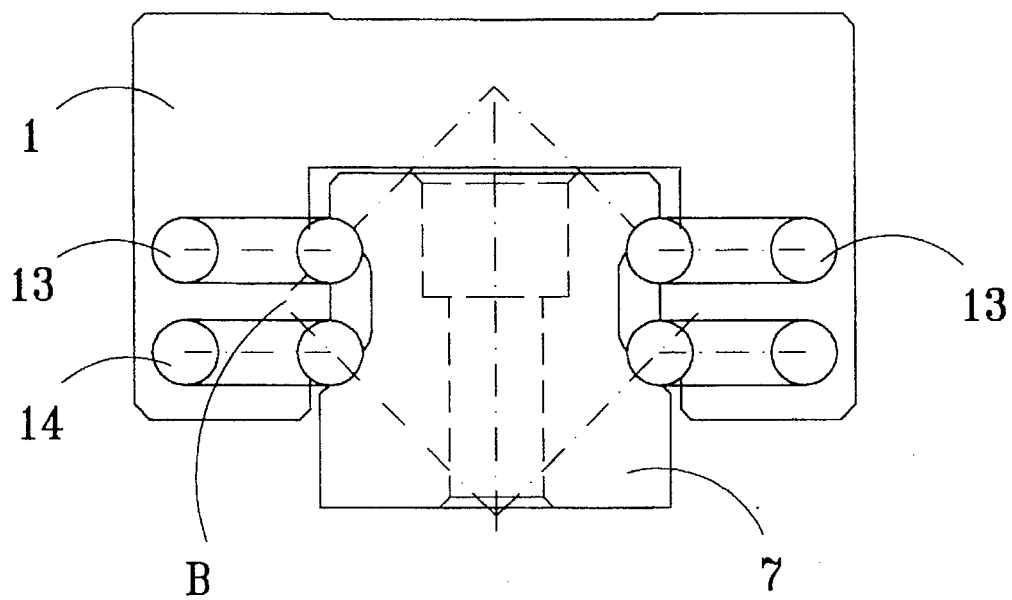
FIG. 2 illustrates the conventional category two linear ball guide assembly.
Figure 3:
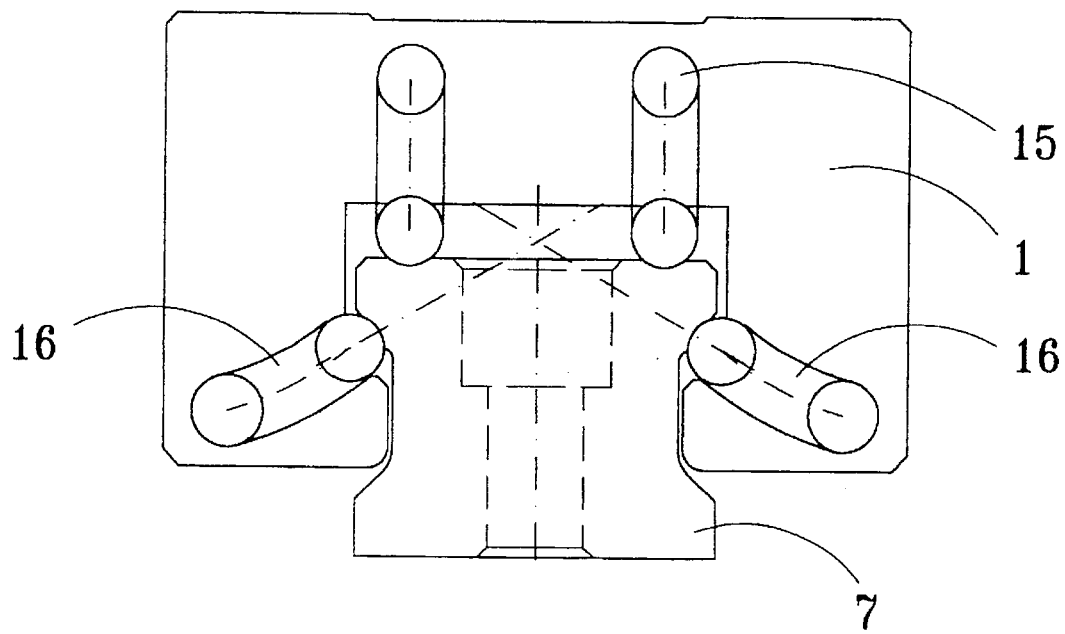
FIG. 3 illustrates the conventional category three linear ball guide assembly.
Figure 4:
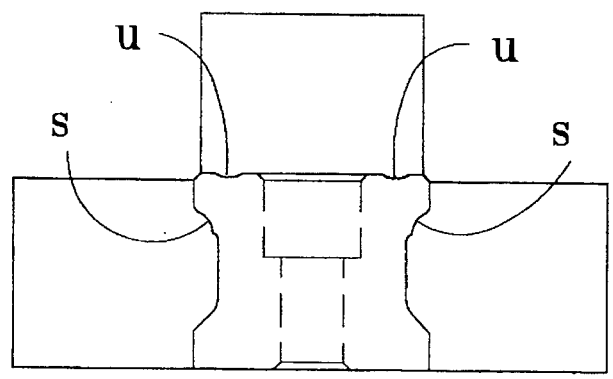
FIG. 4 illustrates the machining profile for category three linear ball guide assembly's rail.
Figure 5:
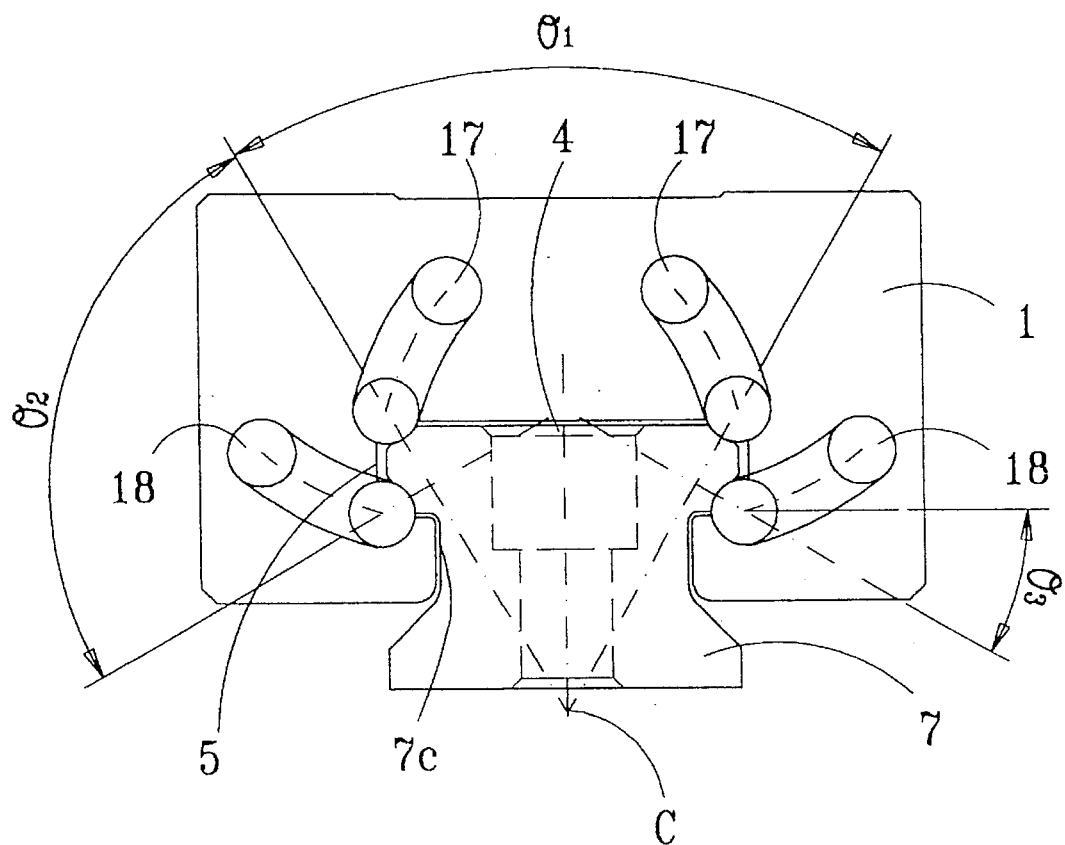
FIG. 5 illustrates the embodiment of a linear ball guide assembly of this invention.
Figure 8:
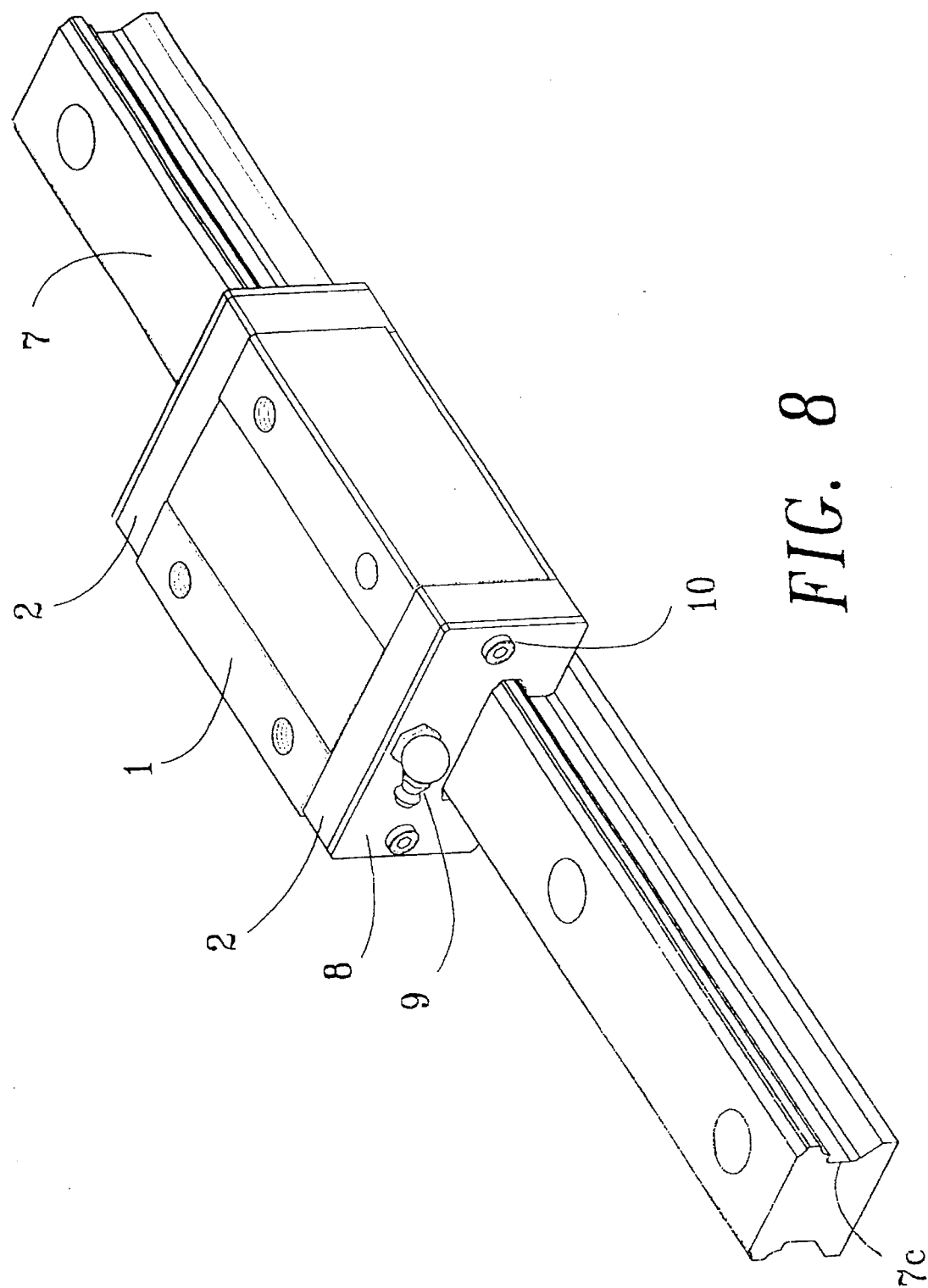
FIG. 8 is a schematic view of this invention.
Figure 19A:
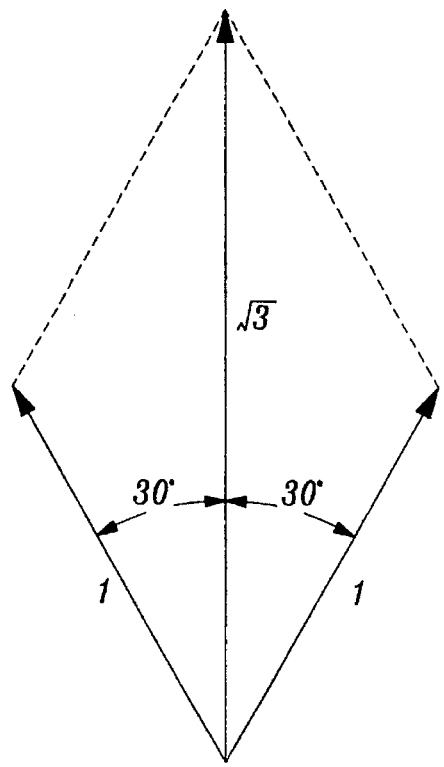
FIG. 19(a) is the force vector diagram for this invention when a pure downward radial force is exerted on the sliding body.
Figure 19B:
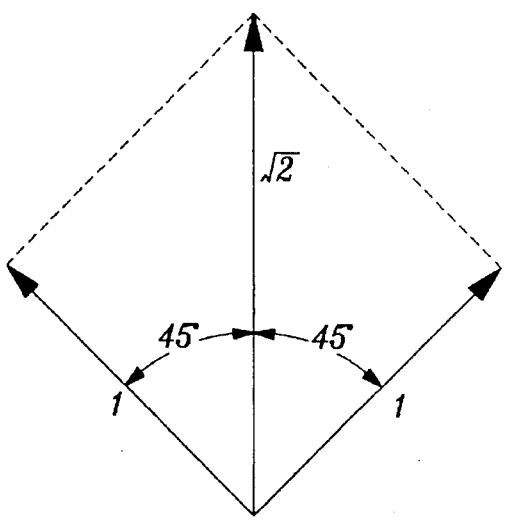
FIG. 19(b) is the force vector diagram for the conventional category one and two types' linear ball guide assembly when a pure downward radial force is exerted on the sliding body.

Referring to FIG. 5 and FIG. 8, the proposed invention is a four-row linear ball guide assembly having high radial load capacity. There is a rail (7), a sliding body(1), two side plates (2), eight guiding blocks (3), an upper retainer (4), two lateral retainers (5), two seals (8) and steel balls. Rail (7) has a substantially flat bottom surface and a relatively narrow middle section. There are arc-like grooves formed on the four corners of the top section of the rail. The radius of the arc is slightly larger than that of the steel ball. The angle θ1 formed by the load directions of the top two rows of the steel balls (17) is about 60 degrees. The angle θ3 formed by the load direction of the lateral row (18) and the horizontal line is about 30 degrees. The angle θ2 formed by load direction of tile top row (17) and the lateral row (18) on the same side is about 90 degrees. When a pure downward radial force is exerted on a sliding body (1), the angle formed by the pure downward force direction and the load direction of the top row steel balls is about 30 degrees. The force diagram for this type is shown in FIG. 19(a). Consequently, from the Sine law viewpoint, total radial load capacity for the whole assembly is about 1.73 times larger than that of a single row of steel balls under normal force. In addition, when compared with conventional category one or two ball guide assembly whose force diagram is shown in FIG. 19(b), the load capacity of the proposed invention is increased by 22%. When the force inclines 30 degrees from the vertical line, three rows of balls can bear the load and the load capacity is about 1.074 times that of a single row of balls trader normal force. It is about 4% greater than conventional category one or two ball guide assembly (aforementioned load capacities do not consider the geometric factor of the groove's profile of rail, such as the ratio of the curvature radius of the profile Ra and steel ball diameter Dw, if geometric factor is considered and included, tile load capacity can be further increased).

Figure 6:
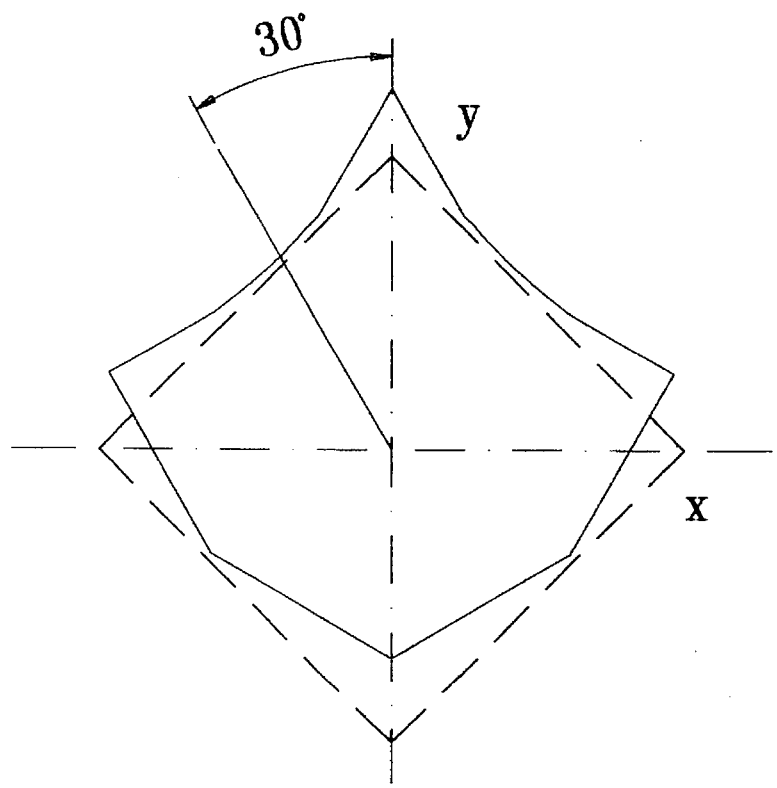
FIG. 6 illustrates the comparison of load capacity between this present invention and conventional category one and two type's four-row linear ball guide assembly.

FIG. 6 illustrates the load distribution range. Solid lines show the load capacity of the present invention and dash lines show the load capacity of conventional category one or two ball guide assembly. X-axis represents horizontal direction and Y-axis represents vertical direction. When the combined force (radial and lateral force) is 0 to 80 degrees inclines from the vertical line, the load capacity can be increased from 3.7 to 22%.

When a pure radial force is applied, the rigidity of the guide assembly is a function of many factors, e.g., diameter of steel ball, number of balls under load, preload, the load direction of balls, material characteristics and geometric factor. When only load direction is taken into account, file rigidity of this invention can be increased by 40% compared with conventional category one or two guide assembly. The improvement in rigidity is particularly useful for industrial use as conventional ball guide assembly is notably weak in rigidity.

Figure 7:
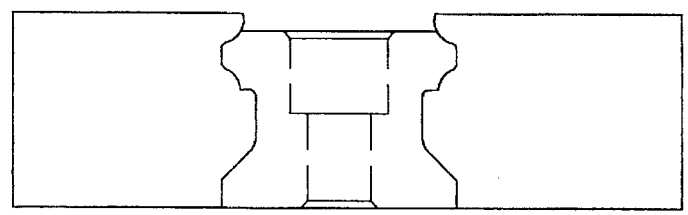
FIG. 7 illustrates the machining profile of the rail of this present invention.

FIG. 7 illustrates the machining profile of the rail of this present invention. The machining process for this new type rail assembly can be done as long as the machine has two spindles. The machining position can be more precisely positioned and the cost will be greatly reduced.

Figure 16:
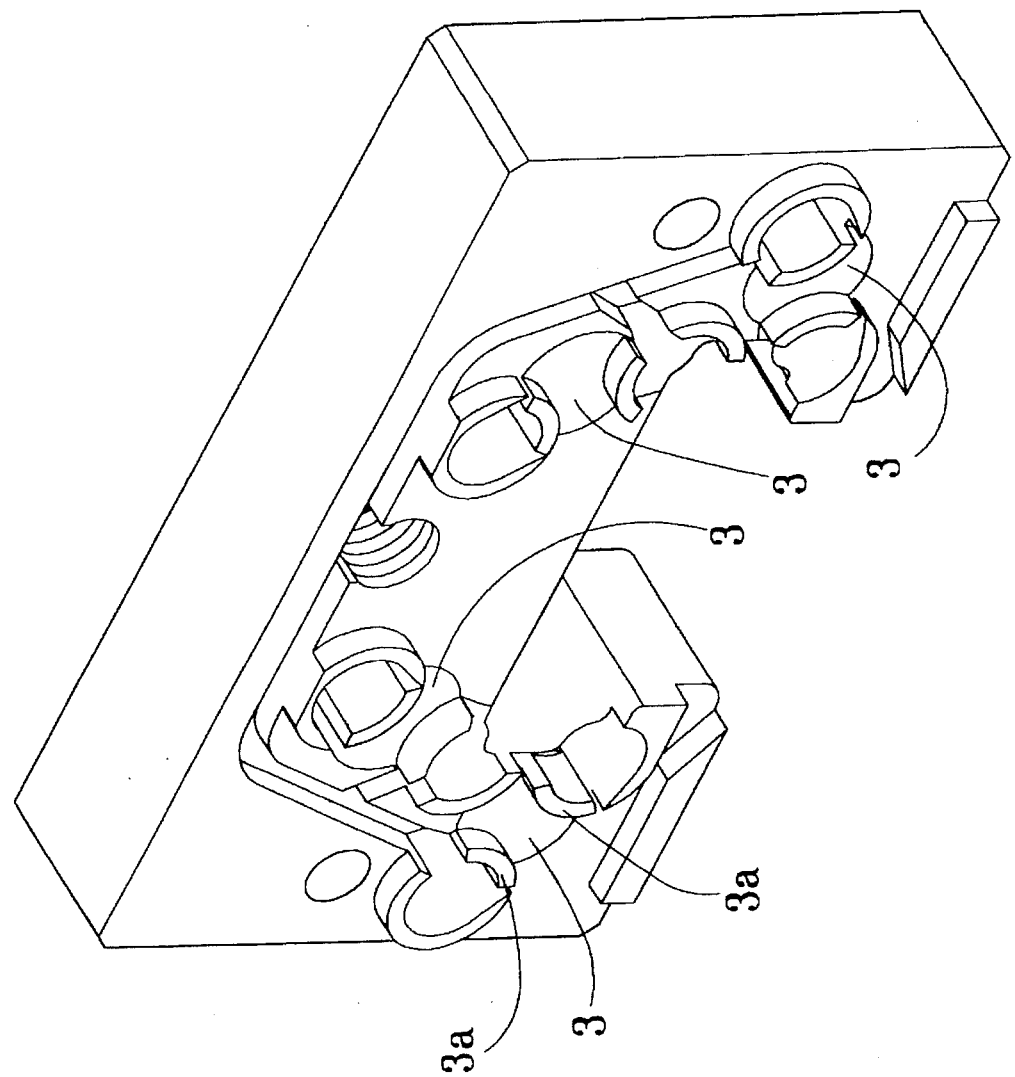
FIG. 16 is the schematic view of a guiding block being assembled with a side plate.
Figure 17:
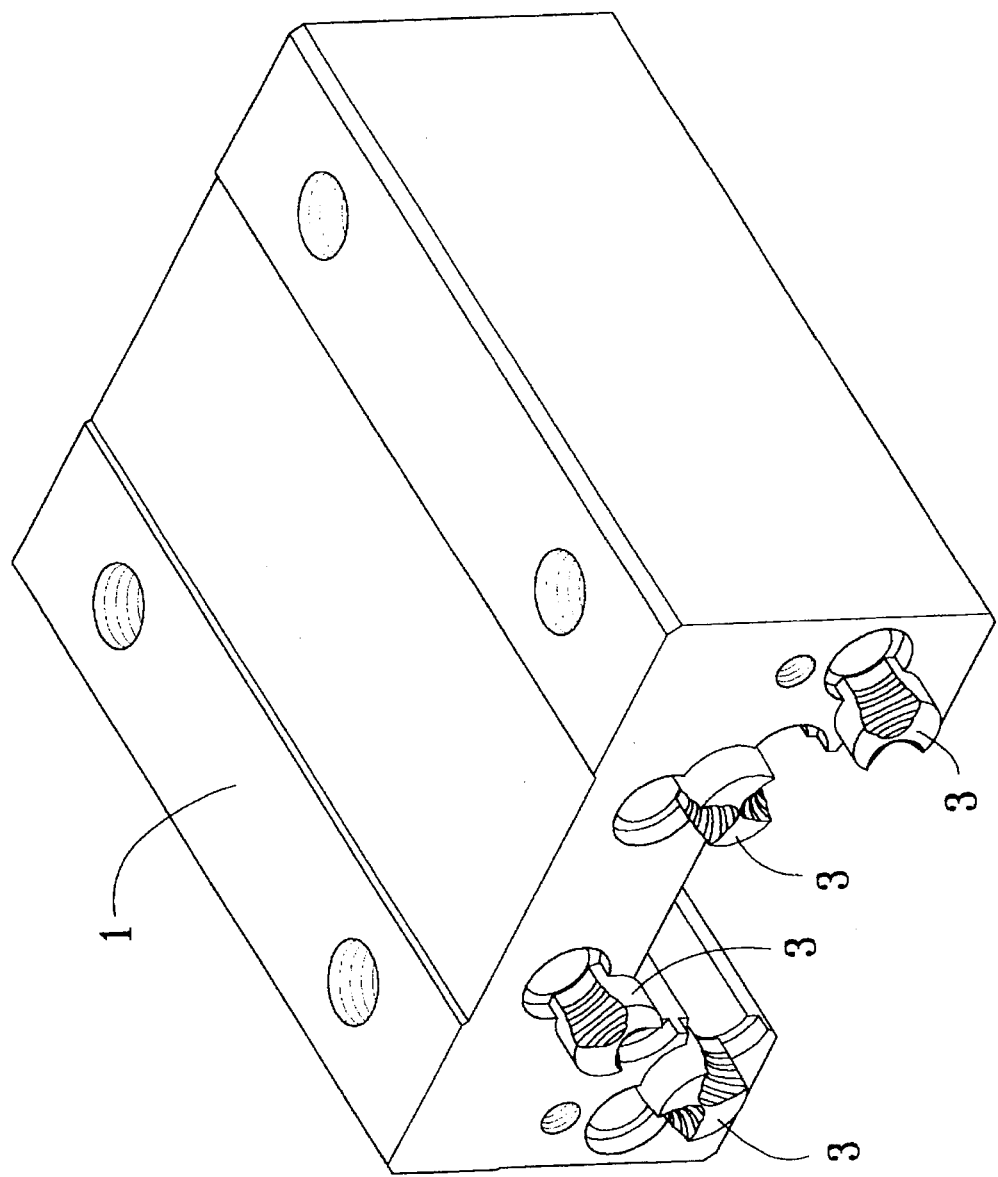
FIG. 17 is the schematic view of a sliding body being assembled with guiding blocks.
Figure 18:
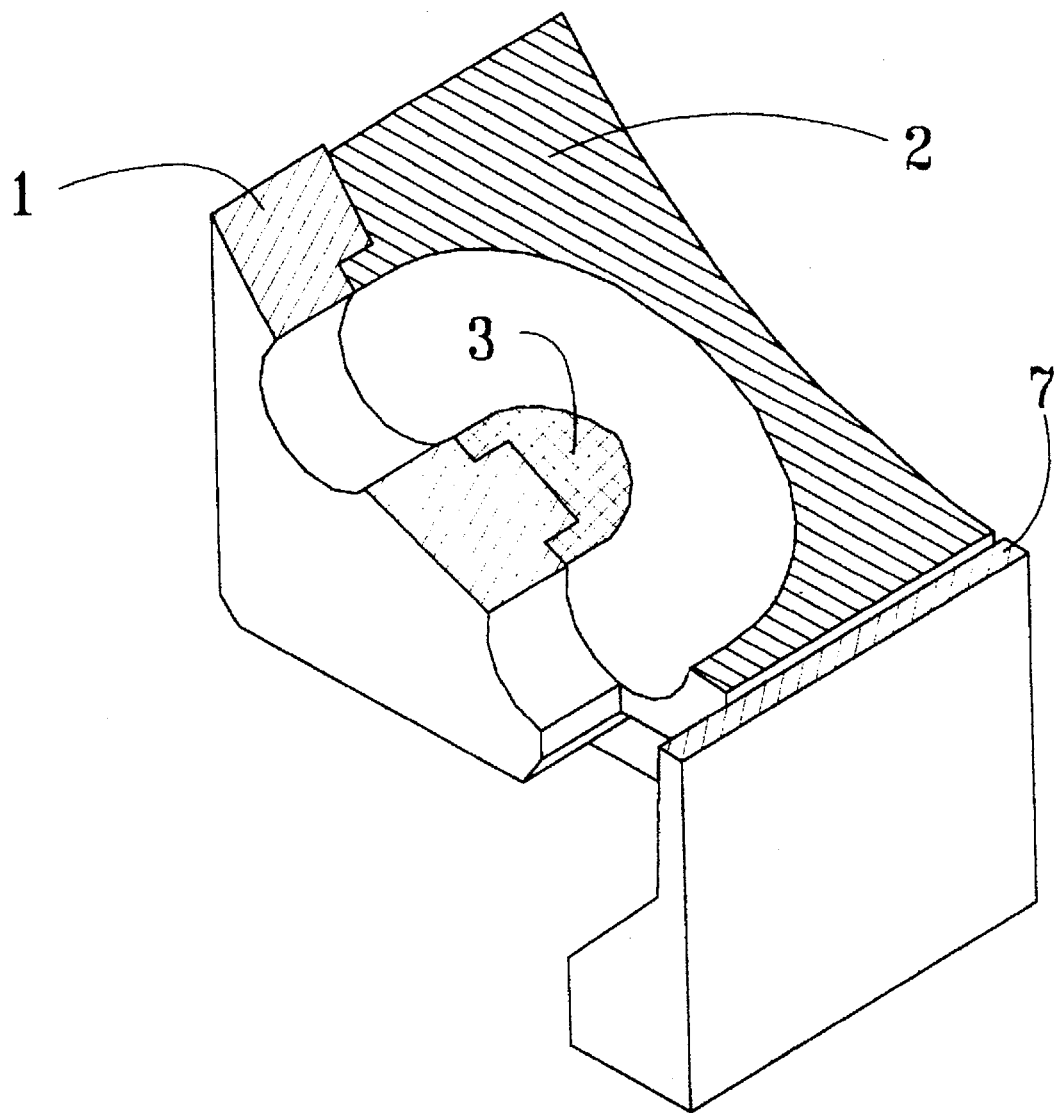
FIG. 18 is the cross-sectional view for the assembly of a side plate, a sliding body and a guiding block.

FIG. 8 through 11 are the schematic drawings for this invention. For improving the smoothness of the circulation systems, this invention adopt two side plates (2) shown in FIG. 10 and guiding blocks (3) shown in FIG. 11 both with C-shaped protrusive flanges (2a) and (3a), respectively. For the same purpose, there are spot holes (1e & 1f) formed on both ends of ball circulation holes (1d) and the corresponding ball grooves (1c) of the sliding body. When the side plate (2) and guiding block (3) are matched with the sliding body (1), the protrusive flanges (2a) and (3a) will perfectly match the spot holes (1e & 1f) on the sliding body. Since the circulation holes (1d) and spot holes (1f) can be precisely machined as well as the spot holes (1e & 1f) on the side plate (2) and guiding block (3) can be positioned correctly, the steel balls can be smoothly circulated as shown in FIGS. 16 through 18.

To further improve the smoothness of the steel ball circulation, there is a guiding lip (2h) (FIG. 10) on the side plate (2) to be inserted into the sliding body (1). The steel ball thus can move smoothly between the loaded ball groove (1c) and the connecting passage (2g). Concave recess (7c) (FIG. 5 and FIG. 8) of rail (7) allows guiding lip (2h) have adequate thickness to prevent guiding lip from breakage.

Figure 9:
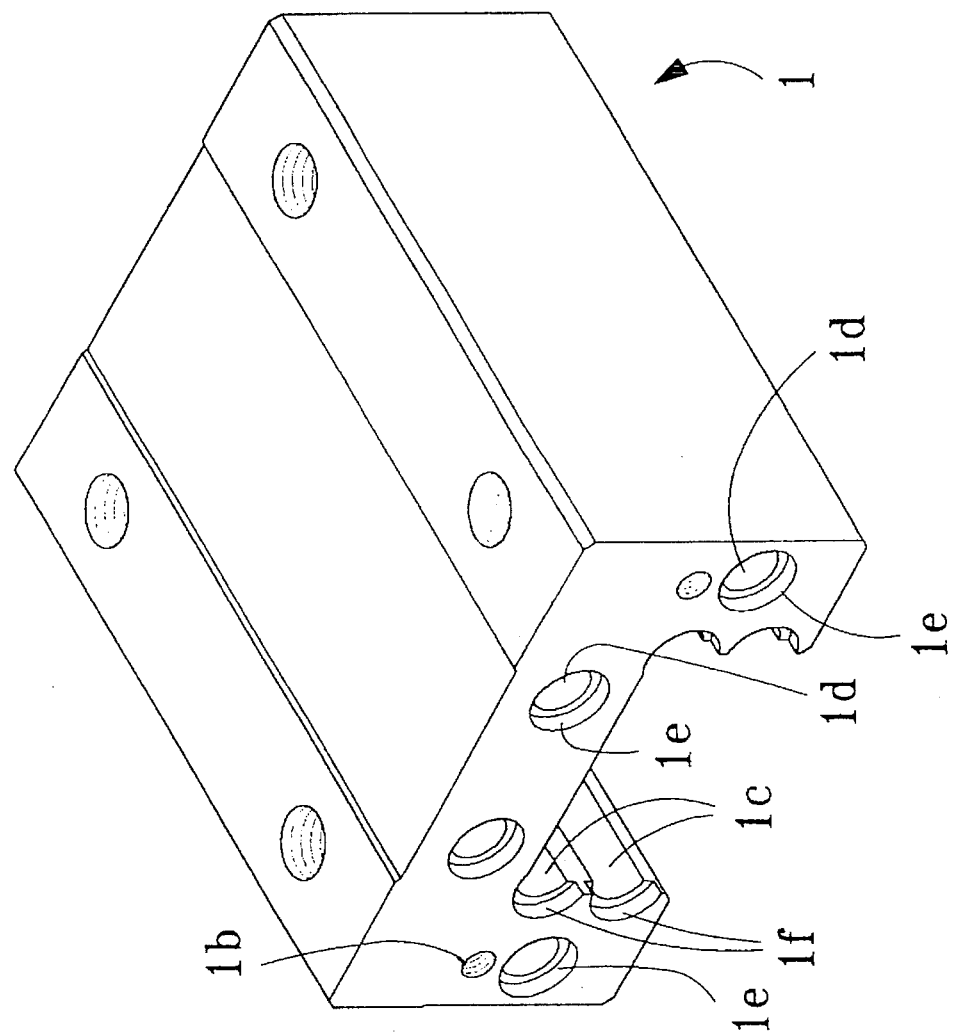
FIG. 9 is the schematic view of a sliding body of this invention.
Figure 10:
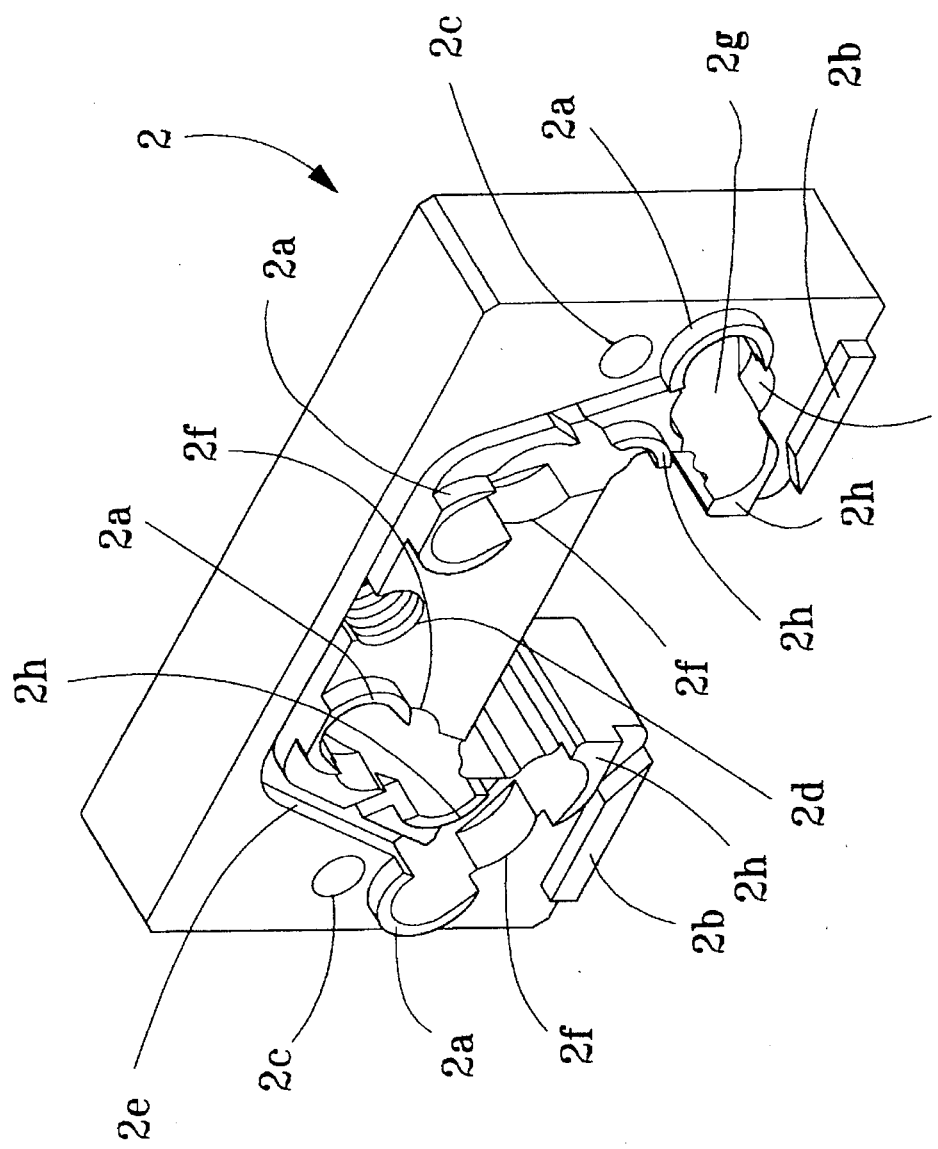
FIG. 10 is the schematic view of a side plate of this invention.
Figure 11:
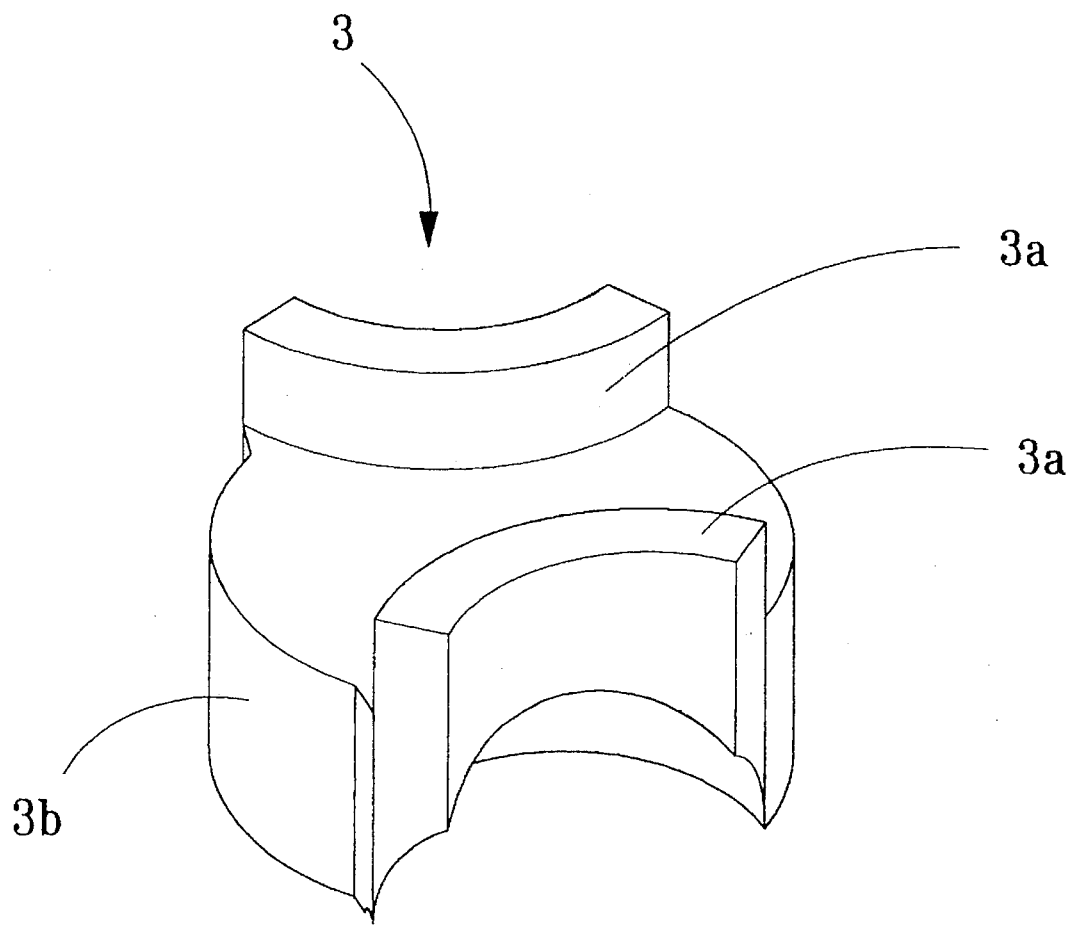
FIG. 11 is the schematic view of a guiding block of this invention.

Practically, spot holes (1e) of circulation holes (1d) are precisely close-working fitted with protrusive flanges (2a) for the purpose of locating. Spot holes (1f) of ball grooves (1c) are loosely fitted with guiding lips (2h) in order to assemble the side plates (2) into the sliding body (1). Protrusive flanges (3a) are used to position guiding blocks (3) (FIG. 11) and sliding body (1) (FIG. 9). In order to avoid the guiding blocks (3) from falling into side plates (2), there are round sink holes (2f) formed in the side plate (2) (FIG. 10) to house a round seats (3b) on the guiding blocks (3). Thereby side plate (2) can be secured firmly on the guiding block (3).

Figure 12:
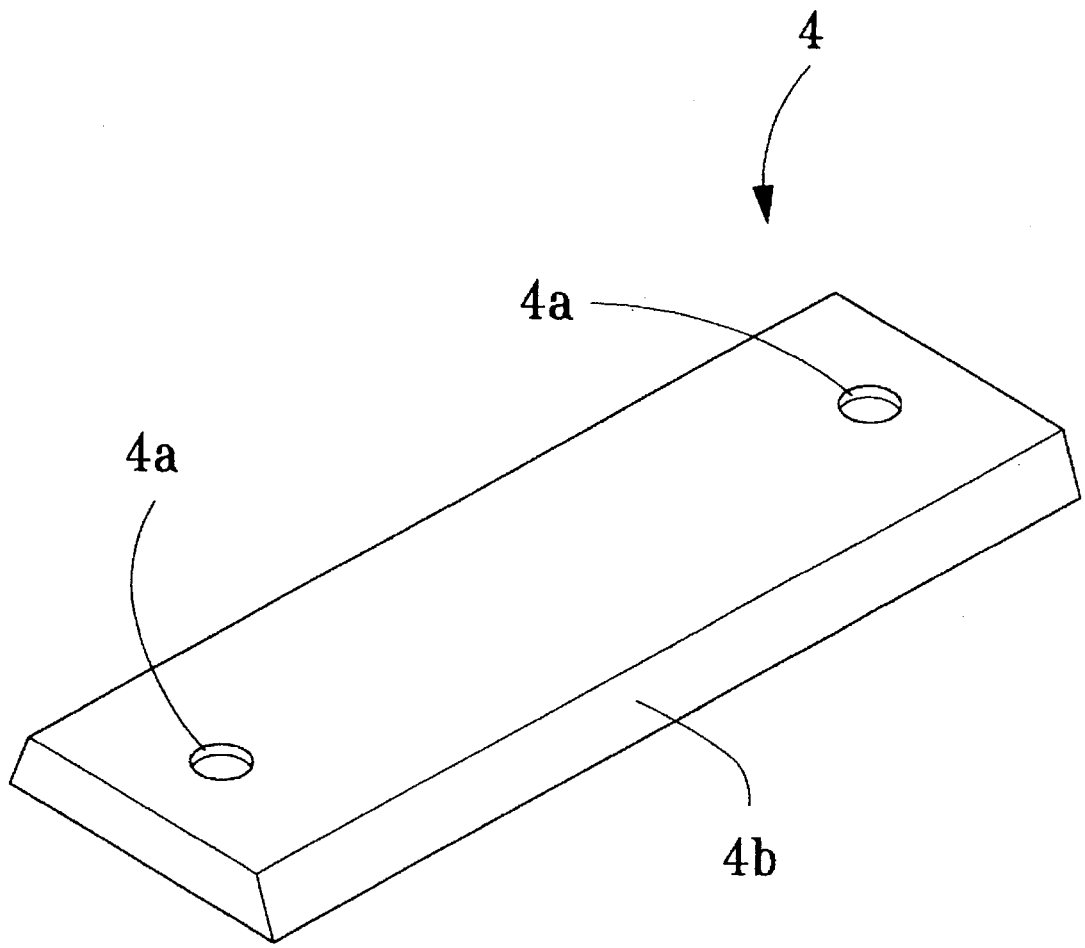
FIG. 12 is the schematic view of an upper side's steel ball retainer of this invention.
Figure 13:
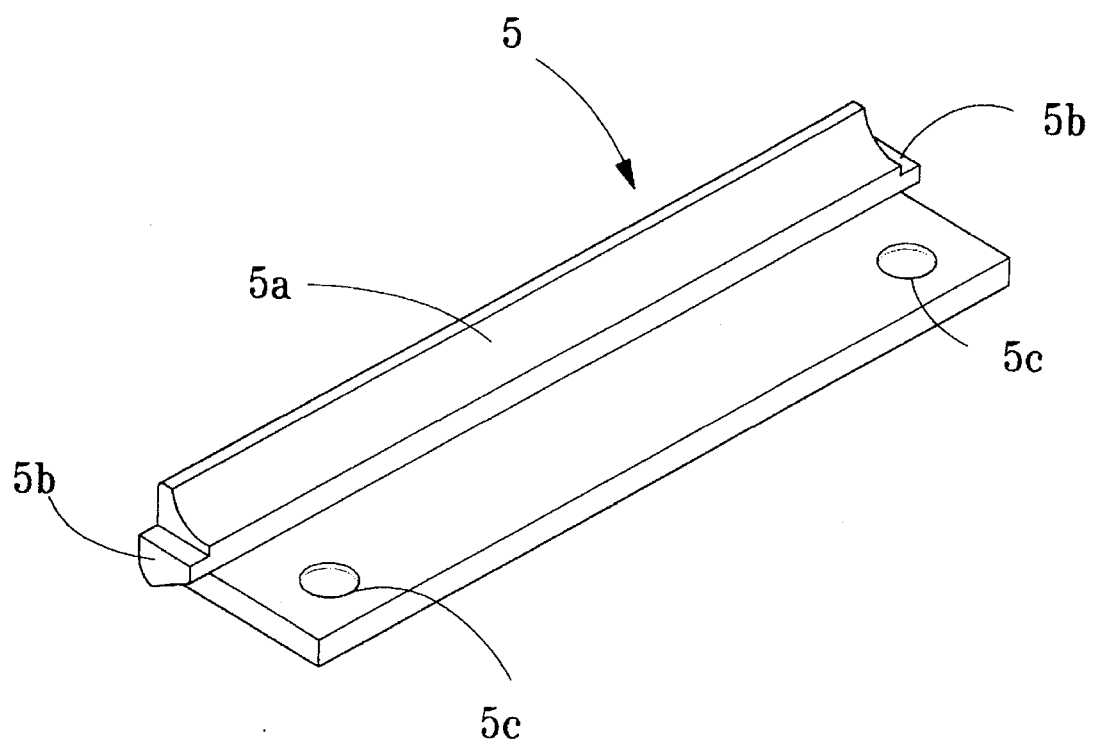
FIG. 13 is the schematic view of a lateral side's steel ball retainer of this invention.
Figure 14:
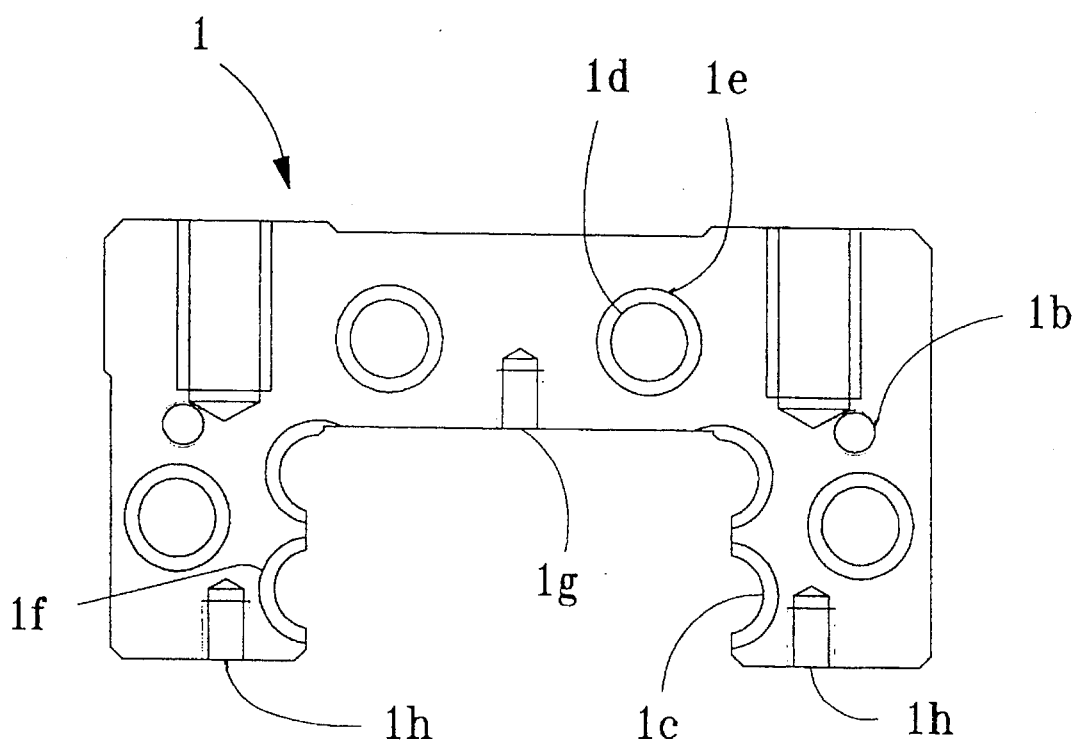
FIG. 14 is the front view of a sliding body of this invention.
Figure 15:
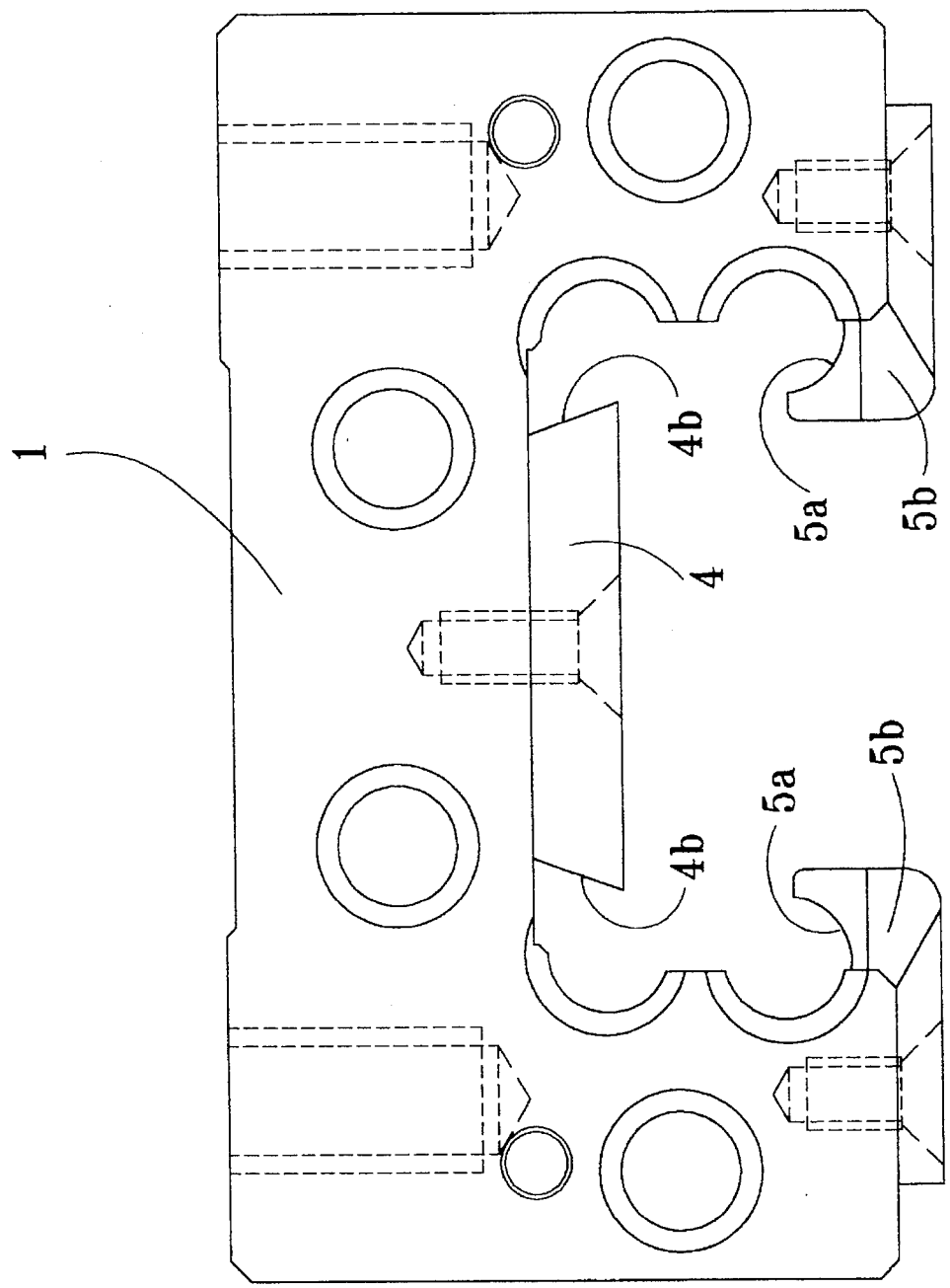
FIG. 15 is the front view of a sliding body being assembled with upper and lateral sides' steel ball retainers.

In order to prevent the steel balls from filling off the grooves in the guide assembly when sliding body (1) and rail (7) are separated from each other, the present invention provided with an upper retainer (4) (FIG. 12) and two lateral retainers (5) (FIG. 13). The upper retainer (4) is secured by two screws (holes 4a, FIG. 12) on the sliding body (1) (screw holes 1g, FIG. 14). Two lateral slant surfaces (4b) are formed to keep the steel balls (17) from falling off. Lateral retainer (5) is secured by two screws (holes 5c, FIG. 13) on the sliding body (1) (screw holes 1h, FIG. 14). Curved surface 5a can also keep steel balls from falling off. There are wedges (5b) at each end of the retainer (5) to be correctly positioned where is between guiding lip (2h) and snap block (2b) of the side plate (2)(FIG. 10) for the sake of the stability of the retainer (5). FIG. 15 illustrates the assembly of a sliding body (1) and retainer (4,5) where the snap block (2b) of the lateral retainer can be omitted, and lateral retainer can be preferably made by punching process.

Referring to FIG. 8, dirt seals (8) are provided at each end of the ball guide assembly to prevent dirt or dust from entering into it. There is a grease nipple (9) provided on the seal (8). It can be screwed on side plate (screw holes 2d, FIG. 10). There are oil slots (2e) formed on the side plate (2). Seal (8) is secured by a screw (10) through a hole (2c) on the side plate (2) to the screw hole (1b) on the sliding body (1).

Many changes and modifications in the above described embodiment of the invention can, of course, be carried out without departing from the scope thereof.

Accordingly, to promote the progress in science and the useful arts, the invention is disclosed and is intended to be limited only by the scope of the appended claims.

What is claimed is:

1. A linear ball guide assembly with four rows of steel balls having high radial load capacity, comprising:

a rail having a substantially flat bottom surface and a relatively narrow middle section, including arc-like profile grooves formed on the four corenrs of the top section of the rail in upper-right, upper-left, lower-right and lower-left directions, wherein the radius of the profile of said groove is slightly greater than that of said steel ball, wherein the load directions of said upper-right and said upper-left grooves form a about 60 degrees angle, the load directions of said upper-right and said lower-right grooves form a about 90 degrees angle, and the load directions of said upper-left and said lower-left grooves form a about 90 degrees angle;

a sliding body having four circulation holes and four steel ball grooves formed therein, wherein said circulation holes and said steel ball grooves have spot holes formed respectively at both ends thereof;

two side plates each having four substantially semicircular-like connecting passages which may be disposed on a curved surface but not necessary on a plane, to allow said steel balls circulate from said steel ball grooves into said circulation holes, and also having C-shaped protrusive flanges which are adjacent to the ends of said circulation holes for engaging with said spot hole on said sliding body, wherein said side plate also includes a protrusive stud adjacent the groove near the connecting passage to be inserted into said sliding body;

eight guiding blocks each having a substantially circular base engaging with a sink hole formed on said side plate, wherein said guiding block has two C-shaped protrusive flanges on the top for matching with said spot holes in said sliding body;

two lateral retainers disposed at two lateral sides of the bottom of said sliding body, wherein said lateral retainer has a curved surface to prevent the steel ball from falling off when said sliding body is separated from said rail, the lateral retainer also have a wedge-shaped stud at both ends for matching with said side plate;

an upper retainer disposed under the bottom surface in the center portion of said sliding body having two lateral and slant surfaces to prevent said steel balls in the top two rows from falling off; and two seals disposed on the outside surface of said side plates to prevent dirt or dust from entering.

2. A linear ball guide assembly of claim 1, wherein said semicircular-like connecting passage in said side plate is a simple semi-circular passage.

3. A linear ball guide assembly of claim 1, wherein said lateral retainers have no wedge-shaped stud, and said retainers are manufactured by punching process.

* * * * *